Sept. 23, 1958     G. O. GRAVES     2,853,027

FOOD PROCESSING MACHINE

Filed Dec. 14, 1955     3 Sheets-Sheet 1

INVENTOR.
GEORGE O. GRAVES
BY
M. A. Hobbs
ATTORNEY

INVENTOR.
GEORGE O. GRAVES

Sept. 23, 1958   G. O. GRAVES   2,853,027
FOOD PROCESSING MACHINE
Filed Dec. 14, 1955   3 Sheets-Sheet 3

INVENTOR.
GEORGE O. GRAVES
BY
M. A. Hobbs
ATTORNEY

United States Patent Office

2,853,027
Patented Sept. 23, 1958

2,853,027

FOOD PROCESSING MACHINE

George O. Graves, Mishawaka, Ind.

Application December 14, 1955, Serial No. 553,088

3 Claims. (Cl. 107—14)

The present invention relates to a food processing machine and more particularly to a machine for producing cereal products such as corn meal sticks or collets.

In the processing of corn meal to produce collets, the meal is first mixed with water in an amount less than that required to form a paste, and the resultant mixture is ground and extruded at a temperature sufficiently high to vaporize the moisture in the corn meal mix. The material as it emerges from the extrusion die, from which it is severed into sections of the desired length, is cylindrical in shape, highly cellular and relatively brittle. A machine for performing the foregoing operation is disclosed in Patent No. 2,705,927 to Graves et al. The material thus produced is further processed by baking, salting and coating with a cheese mix and is then packaged ready for shipping. The final product to be satisfactory must be uniform in texture and flavor and should be substantially the same size and shape. Normally considerable care and skill must be exercised in the operation of the machine used in the production of the untreated collets or sticks if a satisfactory product is to be obtained. Since operators having the necessary skill for properly assembling and operating the machine are not always available, it is important that the care and operation of the machine be made sufficiently simple that unskilled help can perform those functions. It is therefore one of the principal objects of the present invention to simplify the assembly and operation of machines of the type disclosed in the aforementioned patent.

Another object of the present invention is to provide a machine for producing untreated cereal collets, which can readily be assembled for operation and easily serviced and cleaned between operations.

Still another object of the invention is to provide a machine of the aforesaid type wherein the extrusion head or die can be readily and accurately mounted in operating position in the machine and easily disassembled and cleaned after operation of the machine has been completed.

A further object of the invention is to provide an extrusion head or die for a machine of the foregoing type which will consistently produce cereal sticks or collets of uniform texture, size and shape and which can be placed in operation with a minimum amount of time and effort.

In order to obtain the foregoing objects and other objects which will become apparent from the following description, the present machine includes a hopper for the corn meal, a mixing chamber which receives the meal from the hopper and mixes it with a small amount of water, a single plate die providing one or more extrusion stages for the corn meal mix, and a means for receiving the mix from the mixing chamber and forcing it through the extrusion die while said die is maintained at a temperature sufficient to vaporize the moisture initially in the meal and that added to form the mix. A power operated knife or the like synchronized with the operation of the means propelling the meal through the die is provided for cutting the extruded material into the desired lengths.

My invention may be more fully understood by reference to the accompanying drawings, wherein.

Figure 1:
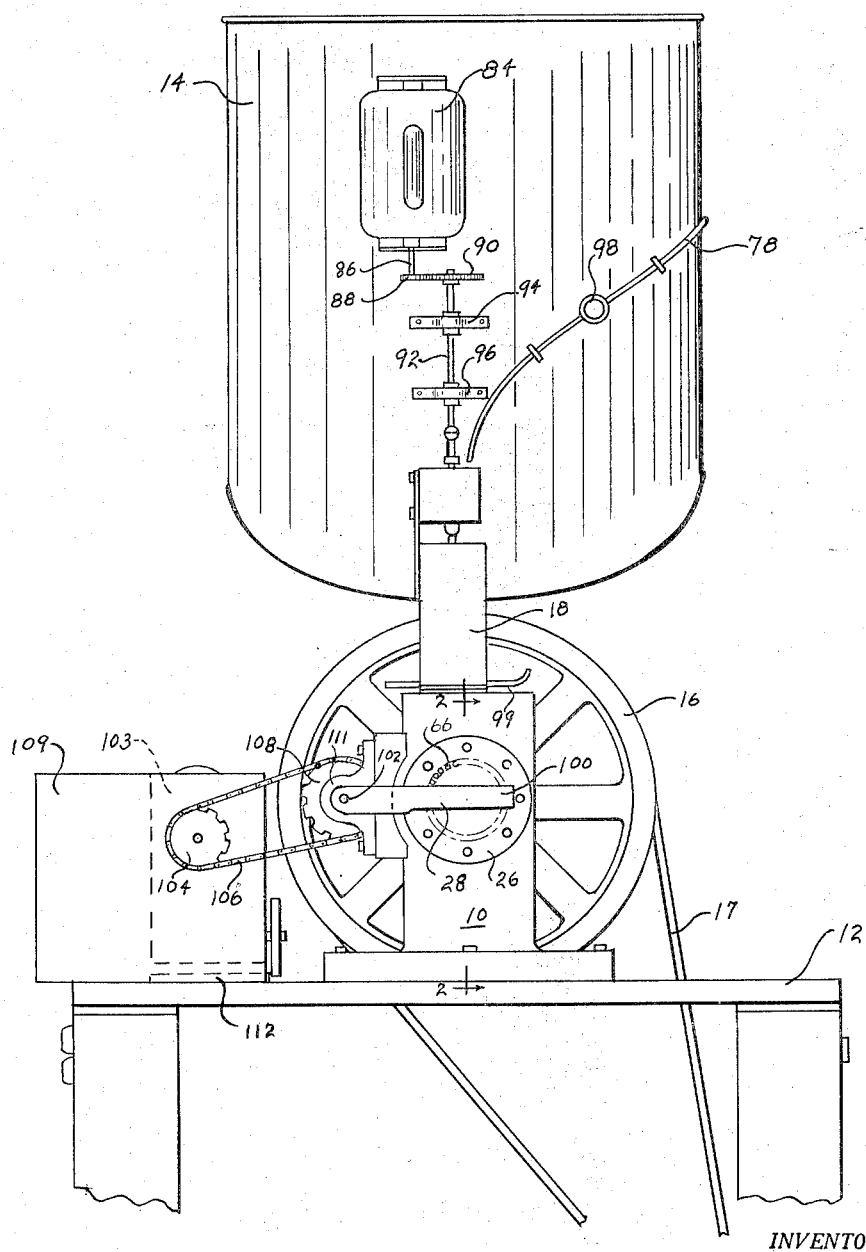
Figure 1 is a front elevational view of my machine, showing only a portion of the base on which it is mounted.
Figure 2:
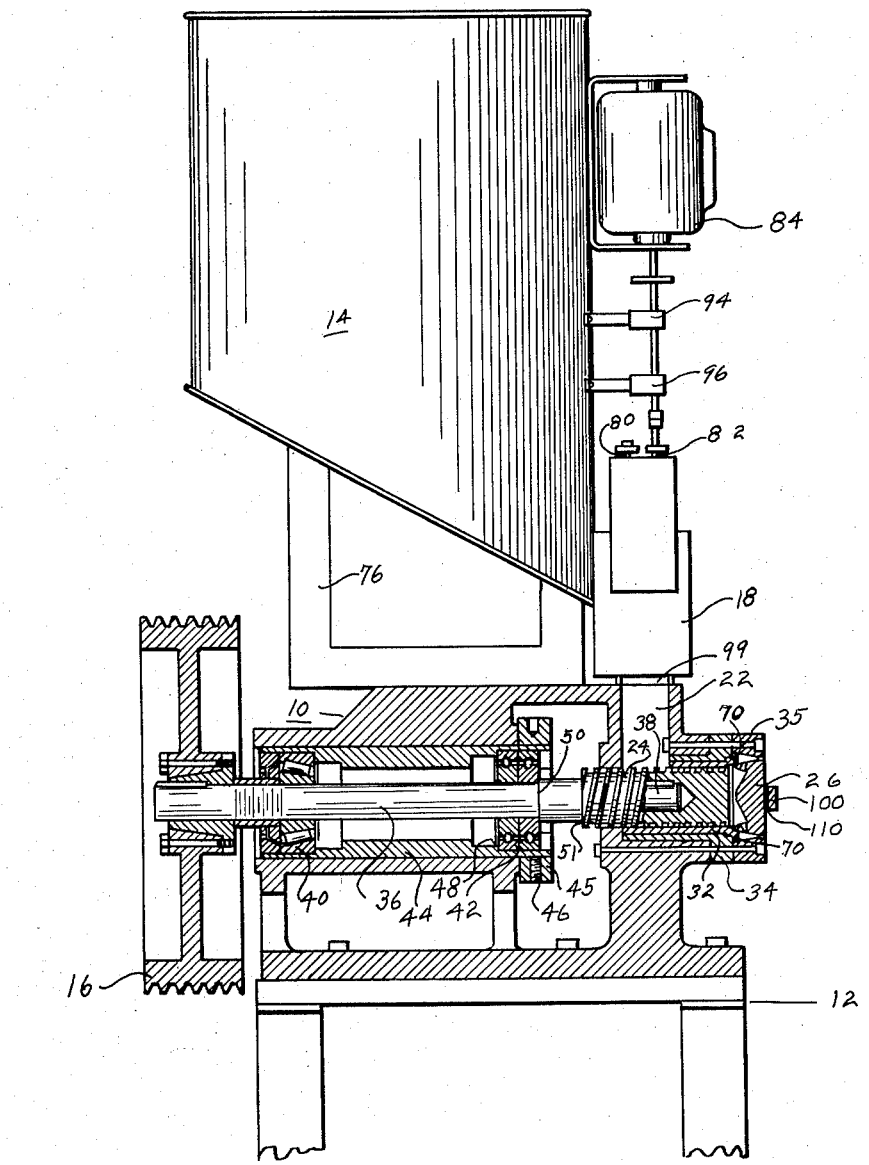
Figure 2 is a side elevational view and partial cross-sectional view of the machine, the section being taken on line 2—2 of Figure 1.
Figure 3:
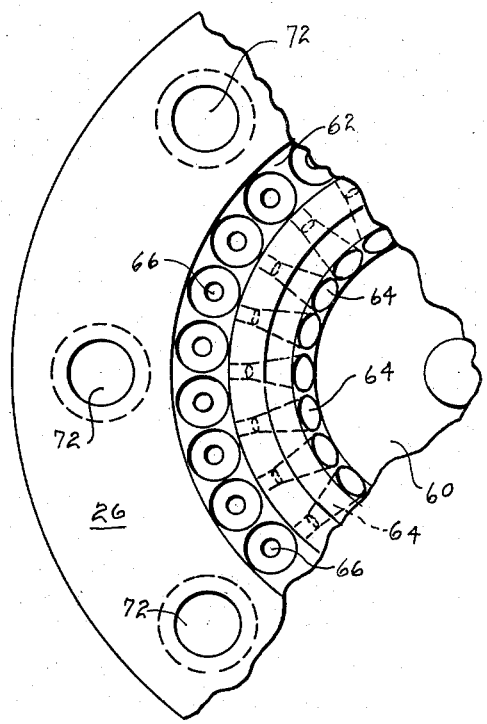
Figure 3 is an enlarged fragmentary elevational view of the extrusion die, showing a portion of the holes in the die in broken lines.
Figure 4:
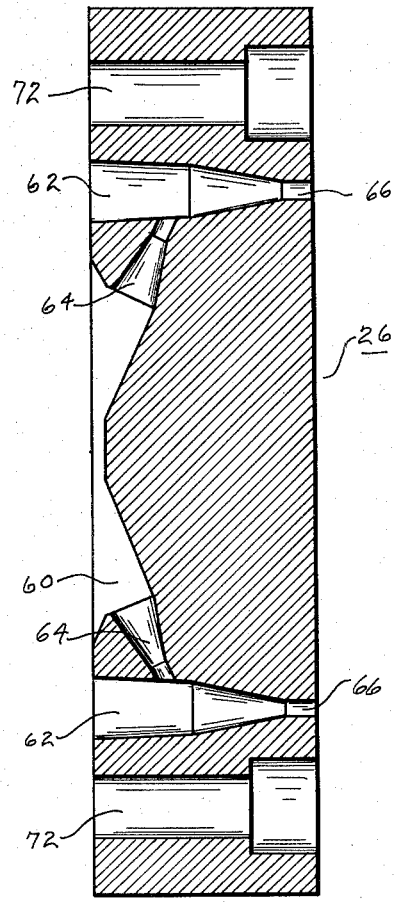
Figure 4 is an enlarged cross-sectional view of the extrusion die, taken on the same line as the cross-sectional view of Figure 2.

Referring more specifically to the drawings, a housing 10 which contains the meal extruding mechanism is mounted on a base 12 and supports a hopper 14 for the corn meal ready to be processed by the machine. The meal extruding mechanism is driven through a pulley 16 and a plurality of V-belts 17 by a motor (not shown) mounted in the lower portion of base 12, and is supplied with corn meal from hopper 14 through a chamber 18 in which the meal is mixed with a small amount of moisture, thoroughly stirred and thence discharged into the throat 22 of the extruding mechanism. This mixture is propelled by a screw 24 toward the right, as shown in Figure 2, and extruded through the holes in a head plate 26 at a temperature sufficiently high to vaporize the moisture in the mixture and to prebake the material sufficiently to render it relatively brittle. As the material emerges from the holes in the head plate in cylindrical form it is cut into sections of the desired length by a revolving power driven knife 28. The sections fall into a chute and thence into a container placed below the machine.

The extruding mechanism is mounted in the housing and consists of screw 24, an insert 32 in which the screw rotates, and head plate 26 through which the meal is extruded under the pressure created by rotation of the screw propelling the meal toward the plate. Insert 32 which may have either a smooth internal surface or a helical groove resembling the screw threads on screw 24 is seated in an adapter 34 disposed in a horizontal bore in the housing. The adapter and sleeve are held in place in the bore by a plurality of bolts or screws 35 extending through the head plate and the upright in which those elements are seated. Screw 24 is driven by the motor through pulley 16 and shaft 36 which is connected to said screw by a spline 38 and is journalled in roller bearing 40 and thrust bearing 42 mounted in the ends of sleeve 44 disposed in a horizontal bore in the housing and held in a fixed position by a collar 45 and set screw 46. Thrust bearing 42 is supported against axial movement away from screw 24 by an annular shoulder 48 on the internal surface of sleeve 44 and shaft 36 is supported against similar axial movement by an annular shoulder 50 on said shaft bearing against the thrust bearing. A second annular shoulder 51 on shaft 36 forms an abutment for screw 24 and prevents it from moving away from the head plate under the pressure created by the screw propelling the meal toward and through the plate.

The head plate 26 consists of a cylindrical block of metal having on its inner surface a centrally located circular recess 60 and an annular groove 62 connected by a series of generally radially outwardly extending holes 64 equally spaced from one another through the metal defining the side wall of the recess. The inlet end of the holes is conically shaped and the outlet end is cylindrically shaped and the holes are spaced so close that the inlet ends thereof are substantially together. A series of holes 66 extending from the bottom of groove 62 longitudinally through the plate forms the outlet for the material extruded through the plate. The inlet end of these holes is also conically shaped and closely spaced to the inlet ends of the adjacent holes. Holes 66 may be the same size as or larger than the holes 64 and are greater in number than hole 64. By this relationship in size and number betwen holes 64 and 66, the total area of holes 66 is substantially greater than the total area of holes 64, thus providing an increasing flow capacity through the plate to handle the increase in mass flow resulting from expansion of the vapor in the meal mixture. Recess 60 which is provided with a conical bottom communicates with the hollow interior of insert 32 and is adapted to receive the meal mixture as it is propelled forward by the rotation of screw 24 and to direct it into and through holes 64. Groove 62 is closed on the inside by adapter 34 which preferably is provided with an annular rib 70 for seating in groove 62 and thereby aligning the plate with the adapter before bolts 35 are inserted in their holes in the housing and plate. Rib 70 has the further advantage of decreasing the volume of groove 66 which must be filled with the meal mixture before the machine will extrude effectively. When the head plate is assembled on the machine bolts 35 are inserted through holes 72 of the plate and through the housing upright and then tightened sufficiently to draw the plate firmly against the face of the adapter and insert to form a joint sufficiently tight that the meal mixture can not ooze out between said members. If rib 70 is formed integrally with adapter 34 the adapter should be constructed in two longitudinal sections to permit insert 32 to be assembled in place behind said rib as an independent element.

Hopper 14 which is mounted above housing 10 on a fixture 76 is a cylindrical container having an open top and a sloping bottom which feeds the dry meal into chamber 18 where a small amount of water from supply pipe 78 is added and the resulting mixture is stirred thoroughly by a pair of rotating beaters mounted on stems 80 and 82 and driven by a motor 84 through shaft 86, reducing gears 88 and 90 and shaft 92, said latter shaft being journalled in and supported by bearings 94 and 96 mounted on the side of the hopper. The amount of moisture which is added to the meal in chamber 18 is controlled by a valve 98 in pipe 78, the amount of water being less than that required to form a paste. After the meal and water have been thoroughly stirred in chamber 18 the mixture is discharged into throat 22 of the housing and is carried from there by screw 24 to the head plate and extruded through holes 64 and 66. The rate at which the mixture is fed to the extruding mechanism is controlled by a sliding door or valve 99.

Knife 28 for cutting the extruded material into sections as it emerges from holes 66 consists of a blade 100 mounted on the end of a shaft 102 which is driven by a motor (not shown) through a gear reduction box 103, sprocket 104, chain 106 and sprocket 108 mounted on the end of shaft 102 opposite the knife blade, said gear reduction box being mounted on a supporting member 109 secured to the base. The cutting edge of the blade is merely a square corner 110 on the forward edge of the blade and is adapted to shear the material from the plate by passing in close proximity thereto. Shaft 102 is journalled in bearings 111 which are supported by housing 10. The motor for driving the blade is mounted behind box 103 on an adjustable motor mount secured to member 112 and is provided with a conventional variable speed pulley so that the speed at which the blade revolves can be synchronized with the rate at which the material is being extruded from the head plate and can be varied relative to said rate to vary the length of the sections into which the extruded material is cut.

In the operation of the foregoing machine, corn meal or the like is added to hopper 14 from the top, and head plate 26 and adjacent portions of the insert, adapter and housing are heated with any suitable type of heating means such as a blow torch or an electrical heating element, until the temperature of these members has been raised to a point above that required to cause vaporization of the moisture in the corn meal mixture. The motor for driving the extruding mechanism, the motor for driving the beaters in chamber 18 and the motor for driving knife 28 are all placed in operation. The meal is then permitted to flow from hopper 14 into chamber 18 where it is mixed by the beaters with a small amount of water from supply pipe 78, and the resultant mixture is permitted to fall into throat 22 in the housing above screw 24. Rotation of the screw moves the mixture from the throat and propels it under substantial pressure into recess 60 of the head plate, causing it to flow through holes 64 into groove 62 and thence through holes 66. Since the temperature of the head plate is somewhat above the vaporization point of the moisture in the mixture, the moisture vaporizes causing the mixture mass to expand and become cellular throughout and light in texture. The temperature at which this vaporization takes place in sufficient to prebake the mixture as it passes through the head plate causing it to become firm and somewhat brittle. As the material emerges from the head plate revolving knife 28 passes intermittently in front of the plate severing the extruded material into sections of the desired length. The speed at which the knife revolves in relation to the rate at which the material is extruded determines the length of the sections. These sections of material represent an intermediate stage in the production of collets, the further steps including a final baking operation, salting and coating with a cheese mix or any other desirable coating mix. The material produced by the machine disclosed herein may be packaged and shipped to other plants and customers where the additional processing steps are performed.

Once the machine is placed in operation no external heat need be applied to the head plate to maintain the temperature at the point required to vaporize the moisture in the corn meal mixture since the pressure created by screw 24 in forcing the mixture through the head plate creates sufficient heat to maintain the plate at the required temperature for satisfactory operation of the machine. By having the extrusion holes all in one head plate, even though there may be a series of extrusion stages contained in the plate, as for example holes 64 representing one stage and holes 66 another stage, the machine can be readily assembled without the assistance of any skilled mechanics or special tools and can be placed in operation with a minimum amount of time required to preheat the head plate. Further, when the machine is disassembled after it has been in operation, the head plate can easily be cleaned of the meal mixture remaining there after discontinuing the operation.

While in the foregoing description reference has been primarily made to the production of collets from corn meal, the machine can be used to produce similar products from other cereals.

Various changes and modifications can be made in the machine and parts of the machine disclosed herein without departing from the scope of the invention.

I claim:

1. In a machine for producing collets from cereal, a one piece cereal extrusion plate having on its inner face, both a central recess and an annular groove, a series of holes connecting said recess with said groove, and a series of holes extending from said groove through said plate.

2. A cereal extrusion plate comprising a one piece body having on its inner face, both a central recess and an annular groove, a series of generally radially extending holes connecting said recess with said groove, and a series of holes extending longitudinally from said groove through said plate having a total area larger than the total area of the holes connecting the recess and groove.

3. A plate for extruding and puffing cereal meal, comprising a one piece body having a central recess on its inner face, an annular groove on the inner face of said body around said recess and spaced therefrom, a series of equally spaced holes connecting said recess with said annular groove, and a series of equally spaced holes extending longitudinally from said groove through said body.

References Cited in the file of this patent

UNITED STATES PATENTS

| | | |
|---|---|---|
| 90,509 | Davidson | May 25, 1869 |
| 540,963 | Duhrkop | June 11, 1895 |
| 1,228,495 | Tanzi | June 5, 1917 |
| 2,005,689 | Hall | June 18, 1935 |
| 2,049,754 | Tanzi | Aug. 4, 1936 |
| 2,705,927 | Graves et al. | Apr. 12, 1955 |

FOREIGN PATENTS

| | | |
|---|---|---|
| 452,563 | Italy | Oct. 25, 1949 |